May 9, 1967 F. G. BUHRENDORF 3,319,241

ELECTROMECHANICAL DATA TRANSMISSION

Filed May 29, 1963

INVENTOR
F. G. BUHRENDORF
BY J. P. Kearns
ATTORNEY

United States Patent Office 3,319,241

Patented May 9, 1967

3,319,241

ELECTROMECHANICAL DATA TRANSMISSION

Frederick G. Buhrendorf, Colts Neck, N.J., assignor to Bell Telephone Laboratories, Incorporated, New York, N.Y., a corporation of New York Filed May 29, 1963, Ser. No. 284,067
8 Claims. (Cl. 340—347)

This invention relates to the transmission and reception of binary data signals by means of magnetic recording techniques.

In my copending patent application Ser. No. 153,920 filed Nov. 21, 1961, now Patent No. 3,164,675, I have disclosed an electromechanical data transmission system using the field structure of a hysteresis synchronous dynamo. In that application the field poles of such a dynamo are separately wound in groups of two and four. Pulsing four-pole groups of such field poles with a direct-current pulse impresses two cycles of a frequency determined by the spacing of the poles and the speed of the rotor on the smooth magnetic surface of the rotor. A two-pole group is used to pre-condition the magnetic surface of the rotor with a magnetic pattern of another frequency so that unpulsed four-pole groups leave this pattern unaffected, while the pulsed groups imprint a new frequency pattern. Another two-pole group is used as a pick-off transducer for an output electrical signal.

While the basic principle of generating a two-frequency binary data signal by electromechanical means set forth in my above-mentioned application is sound, the frequencies generated are fixed by the structure and synchronous speed of the dynamo. Reduction gearing would be required to change the speed. This is a disadvantage from both cost and space standpoints. A further requirement of the prior system is that the spacing frequency be separately generated.

It is accordingly an object of this invention to improve the flexibility of electromechanical data transmission systems in regard to selection of frequency.

It is another object to eliminate the requirement for an external source of one of the two frequencies in a frequency-shift data transmission system using electromechanical means.

It is a further object to increase the speed at which data can be transmitted by electromechanical means.

In accordance with this invention individual record-reproduce heads of soft magnetic material are spaced around a smooth cylindrical rotor at any desired interval. These heads may advantageously be economically constructed to have any number of gaps as needed in a single structure. They may be affixed to a stationary toroidal plate in the center opening of which the smooth cylindrical rotor rotates at a synchronous speed. The frequency may advantageously be changed by selecting the number and spacing of the gaps in each head. Spool wound coils are installed on the poles in any desired combination of turns and wire size. In an illustrative embodiment single-gap heads are shown for simplicity. However, it will be understood that multigap heads can be used where more than one cycle per bit is desired in a particular application.

A continuous frequency pattern may be recorded on the rotor surface by using adjacent single-gap recording heads. One recorder head is supplied with a continuous flow of direct current of a magnitude sufficient to saturate the rotor material magnetically and the other head is pulsed with a current of opposite polarity and double the magnitude of the saturating value at regular time intervals equal to the period of a full cycle at the desired frequency. The pulsing means can be controlled in turn by a trigger signal picked up from the recorded pattern by an additional reproducer head spaced an integral number of half wavelengths of the desired frequency from the heads laying down the pattern. As a simplifying alternative a single recording head can be used. In this event the pulsing current is superimposed on the bias current in the single head.

Two adjacent recording heads will record a half cycle of one frequency or a full cycle of twice the frequency depending on whether they are simultaneously pulsed by currents of the same or opposite polarity.

Similarly, a four-gap recording head will record two cycles of one frequency by arranging the windings so that adjacent gaps are differentially pulsed. It will also record a single cycle of half the frequency by arranging the windings so that the gaps are differentially pulsed in adjacent pairs.

A single gap recording head alone when driven by any externally generated electric wave records a corresponding magnetic pattern on the rotor surface. In addition, a single-gap reproducer can respond to any magnetic pattern on the magnetic surface and reproduce it as a corresponding electric wave.

Both multigap reproducer heads with a single coil inherently and paired single-gap heads with coils in parallel discriminate against a recorded frequency whose wavelength is other than that which would be recorded if the coils were pulsed. Thus, in a frequency-shift system using frequencies which are even multiples, one frequency will generate an electric pulse while the other will produce a null effect.

According to another aspect of this invention a plurality of single-gap recording heads may advantageously be arranged around a magnetizable rotor or along any continuously moving magnetizable surface in such a way as to constitute a combined parallel-to-serial converter and frequency-shift data transmitter. A timing signal is developed using three adjacent heads. Pairs of adjacent single-gap heads arranged in sequence generate a cycle of one frequency to represent a space or "zero" bit or a half-cycle of half the space frequency to represent a mark or "one" bit. A start bit for the serial train is generated in another pair of single-gap heads. Further, by arranging a logic chain a parity bit is also advantageously generated and the polarity of adjacent cycles and half-cycles of mark and space frequencies are controlled to insure smooth wave transitions. Another single-gap head serves as the line signal transducer.

Where it is required that the signal generated be compatible with ordinary electronic discriminators, it may be advantageous to generate more than one cycle per bit. In this case multigap heads are appropriate.

It is a feature of this invention that both marking and spacing frequencies in a frequency-shift data transmission system are generated directly by the same magnetic recording heads. In the system disclosed in my prior application only one of the two frequencies is generated by the recording heads from the marking pulse. The spacing frequency is externally generated.

It is another feature of this invention that magnetic recording heads be grouped around a narrow magnetic drum synchronously driven to produce a frequency-shift data transmission system.

Other objects and features of this invention will become apparent from the following description taken in conjunction with the accompanying drawing in which.

Figures 1, 2, 3, 4:
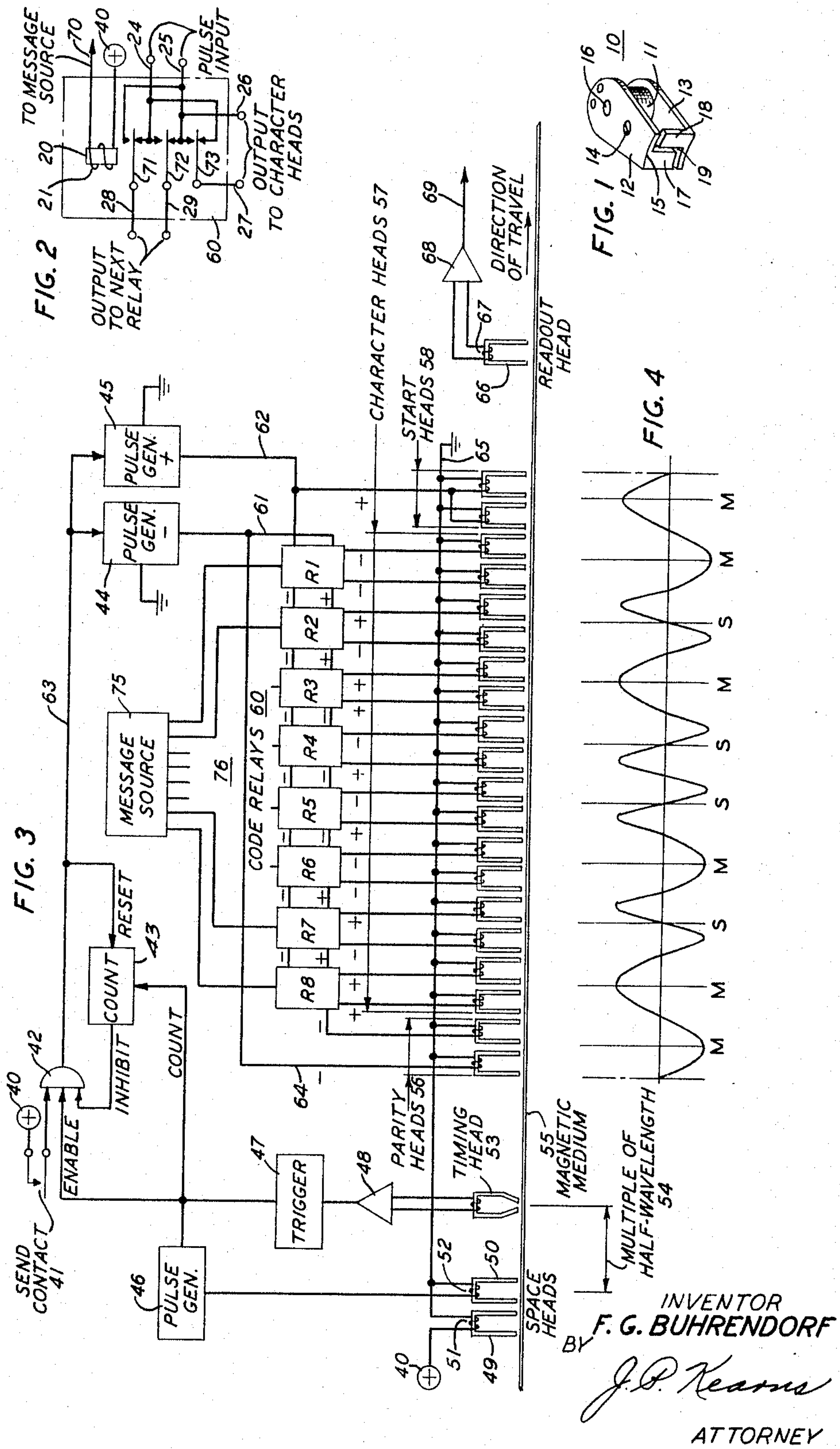
FIG. 1 is a perspective view of a simple single-gap head useful in the practice of this invention.
FIG. 2 is a schematic diagram of a code relay circuit useful in a logic control system for a data transmission system according to this invention.
FIG. 3 is a block-schematic diagram of a data transmission system using the magnetic heads of this invention.
FIG. 4 is a waveform diagram of the line signal produced by the data transmission system of FIG. 3 for a particular coded character.

My copending application disclosed an electromechanical data transmission system using the field structure of a hysteresis synchronous dynamo. Individual windings around the poles of the field structure induced magnetic fields about these poles in response to electric data pulses and recorded magnetic patterns on a smooth rotor of magnetizable matter which corresponded to one or more cycles of an alternating-current electric wave. The frequency of this wave was determined by the speed of the rotor and the spacing of the poles. Because the rotor was most conveniently driven from commercial 60-cycle mains, this frequency was essentially fixed by the pole spacing. It is the purpose of this invention to provide discrete poles controlled by individual windings that can be positioned about the rotor in any desired spacing and thereby provide greater flexibility in the selection of carrier frequencies, higher transmission speeds and lower terminal equipment costs.

A simple structure for a magnetic head is illustrated in FIG. 1. The head 10 comprises two sheets of soft magnetic material 12 and 13 made of low carbon steel, for example, separated by a cylindrical soft magnetic spacer 16 which in turn is surrounded by a winding 11. Terminals are provided in any convenient way for the coil. One end of each lamination 12 and 13 is formed over into a common plane parallel to the axis of the spacer 16. These ends are cut in half and set next to each other like teeth which form alternate poles. An air gap of appropriate width is defined by the space 19 between the two teeth. The end section is then machined on the tooth surfaces to a cylindrical contour 15 suitable for placement in close proximity to a rotatable magnetic drum. The edges of each sheet 12 and 13 are tapered toward the toothed end to facilitate placing a large number of the heads close together about the same drum. A screw 14 secures the two sheets together. A sleeve can be placed around this screw to preserve the spacing between the two sheets. The head of FIG. 1 can readily be made with any number of gaps as necessary for applications where more than one cycle per bit is desired. A convenient size for data transmission work has a maximum dimension of the order of ⅝ to ¾ inch. A similar head can be made from alternate U-shaped soft iron laminations . A coil is fitted on one common leg and the other common ends are gapped as necessary with non-magnetic spacers.

Separate heads of the type shown in FIG. 1 allow the use of almost any number of common poles per coil, almost any spacing between heads and any desired gaps between poles. They also allow the heads to be spaced with respect to each other at the most advantageous distances to reduce cross-magnetic coupling between adjacent pole groupings. Further they permit the use of spool-wound coils with resultant lower cost and greater freedom in the selection of wire size and number of turns as the particular application requires.

The use of these heads disposed around a narrow drum which in turn is mounted on the shaft of a synchronous motor provides the facilities for a variety of utilizations which may be advantageously applied to data transmission systems.

A continuous wave pattern at a desired frequency may advantageously be recorded on a smooth drum by the use of two single-gap heads. One recording head with a gap equal to a half wavelength at the desired frequency is fixed in one position adjacent to a rotating drum. Another pickup head with a narrow gap is spaced from the first head at the same axial distance from the center of the drum. The coil of the first head is provided with a steady flow of direct current at a given polarity and at a magnitude sufficient to saturate the magnetic medium of the drum. The same head is then pulsed periodically with a current of approximately twice the magnitude of the steady current and in the opposite direction at the proper time interval equal to a full cycle of the desired frequency. A continuous wave pattern is then maintained. The second head, spaced circumferentially by some multiple of a half wavelength from the center of the first head, acts as a pick-up reproducer to provide a trigger signal from the induced magnetic pattern to control a pulse generator which provides the double-amplitude periodic pulse mentioned above. There is thus provided a means of recording any desired frequency primarily determined by the space between heads and the speed of the drum. The trigger signal derived from the pick-up head may also be used advantageously to initiate other recordings on the same or other drums in exact phase relationship with the basic frequency pattern.

A single-gap head with a narrow gap may be used above as either an analog reproduce or record head unit with the gap proportioned to give the most desirable frequency response, with regard to the marking and spacing frequencies employed in a given system.

A data transmission system for generating a serial frequency-shift signal wave using magnetic heads of the type already described is shown in FIG. 3. This data transmission system differs from that disclosed in my prior application in that both mark and space frequencies are generated by the same heads. No external source of space frequency is required. Further, a relay logic circuit forms an integral part of the system both for insuring smooth, reversal-free transitions between bits and for generating a parity bit for each word. In addition, the fastest possible speed is achieved because a half cycle of marking frequency completely specifies a "one" bit and a single cycle of spacing frequency specifies a "zero" bit.

The system of FIG. 3 comprises a synchronously-rotating magnetic medium 55 here shown developed into a straight line, twenty-two single-gap recording heads including heads (49, 50, 56, 57, 58), two single-gap pick-up heads (53 and 66) a code relay 60 for each bit, three pulse generators (44, 45 and 46), a trigger circuit 47, a counting circuit 43 and a coincidence gate 42. The message signal source is indicated generally by block 75. It may advantageously be any parallel signal source separately controlling the eight code relays 60, similar to a teletypewriter signal source, for example, on leads 76. In the alternative the signal source may be eight independent, but synchronized, message channels to be encoded in a serial time division channel.

The first two-heads, 49 and 50, having coins 51 and 52 wound about their yokes, are adjacent to medium 55 at the left end of the drawing and serve to erase all previous patterns from the medium as well as to generate a timing pattern. Coil 51 is supplied from direct-current source 40, represented as positive battery, with a current strong enough to saturate the medium magnetically. Head 50 is spaced from head 49 by half the wavelength of a frequency chosen to be the spacing frequency, say 2300 cycles for a voice-frequency system. A pulse generator 46 drives coil 52 on head 50 with a current opposite in direction to the erasing bias on head 49 when triggered. A single pick-up head 53, also provided with a coil, is spaced some multiple of a half wavelength 54 of the chosen space frequency from the center of heads 49 and 50 and produces a timing signal once every spacing frequency cycle. Pick-up head 53 preferably has a narrow gap to make it responsive to transitions on the recorded wave pattern. This timing signal is amplified and rectified as necessary in amplifier 48 to operate a trigger circuit 47, which may advantageously be a monostable multivibrator. The output of trigger 47 is then used throughout the system for synchronization purposes. For example, it synchronizes pulse generator 46, which is assumed to be free-running at a frequency slightly below the desired space frequency. The reverse saturation of the medium under head 50 combined with the forward saturation due to head 49 produces a square-wave pattern at the space frequency. Its output can also be supplied to the data source to control the sampling time in a well known manner.

In the data transmission system illustrated in FIG. 3 each data character is assumed to consist of eight message bits prefixed by a start bit and suffixed by a parity bit. The principles, of course, are equally applicable to longer or shorter character blocks. Two single-gap heads separately wound are required for each bit. The heads are spaced by the amount corresponding to a half cycle of the chosen spacing frequency; in this case, 2300 cycles per second. If a pair of heads is pulsed in unison—in the same current direction—a half cycle of marking frequency, 1150 cycles, is recorded on medium 55. On the other hand, when two adjacent heads are pulsed in opposite polarity directions, a full cycle of spacing frequency is recorded on medium 55. Since the absolute phase of the marking or spacing frequency is immaterial to the decoding process, a logic circuit is provided to control the relative phases of adjacent patterns to preserve phase continuity in the line signal and avoid phase reversals between bits. In the absence of a message signal the spacing frequency is generated continuously.

The character recording arrangement employs two parity heads 56, sixteen character heads 57 and two start-bit heads 58. For each pair of character heads 57 there is provided a code relay 60. The code relays 60, individually designated R1 through R8, are controlled by data registering equipment, such as, message source 75. There are also provided a negative-pulse generator 44 and a positive-pulse generator 45. The outputs of the pulse generators 44 and 45 are connected to the inputs of the first code relay R1. The remaining code relays R2 through R8 are connected in cascade, output to input as shown.

A representative code relay 60 is shown in FIG. 2. Each relay comprises a core 20 wound with a coil 21. One end of the coil is connected to positive battery 40 and the other end 70 to a message source output lead 76 from FIG. 3. Three sets of transfer contacts 71, 72 and 73 are controlled by core 20. The make-portion of set 71 is connected to a pulse input terminal 25. Another input terminal 24 is connected in common to the break portion of sets 71 and 73 and to the make portion of set 72. Input terminal 25 is also connected in common to the break portion of set 72 and the make portion of set 73. Input terminal 25 also has a direct connection to character output terminal 26. The armatures of sets 71, 72 and 73 are connected, respectively, to relay output terminals 28 and 29 and to character output terminal 27. In the case of a spacing bit, coil 21 is not pulsed and input terminals 24 and 25 are connected, respectively, to output terminals 27 and 28 in parallel and to output terminals 26 and 29 also in parallel. In the case of a marking bit the armatures are operated to close to make portions of the transfer sets and input terminals 24 and 25 are connected, respectively, to output terminal 29 and output terminals 27 and 28 in parallel. Character output terminals 26 and 27 are tied together and to input terminal 25 at this time. The effect then is to place output terminals 28 and 29 at the same polarity as input terminals 24 and 25 for spacing bits and at opposite polarity for marking bits. This is logical since a marking bit is represented by a half cycle of the lower frequency and a phase reversal is required between bits to preserve phase continuity. At the same time character output terminals 26 and 27 are of opposite polarity for spacing bits and of the same polarity for marking bits. Other code relay arrangements performing these same functions can be devised by those skilled in the art.

Pulse generators 44 and 45 are triggered over lead 63 from the output of trigger circuit 47 through gate 42. The latter gate is of the coincidence type and has three input points. The send contact input of gate 42 is enabled from battery 40 by the message source 75 in any suitable manner when contact 41 is closed to indicate that a message character is to be transmitted. The enable input from trigger 47 has already been mentioned and occurs at regular intervals at the spacing frequency. The inhibit input occurs whenever counter 43 is counting. The counter is arranged to count to eleven, one more than the number of bits per character including start and parity bits. Because of the reset lead connected to the output of gate 42, however, the inhibit output is removed only during the eleventh count. Hence, an output appears on lead 63 to the pulse generators 44 and 45 only when the send contact 41 is closed and counter 43 is resting at the eleventh count. The reason for the counter is to allow time for the character recorded during the eleventh count to be read out by readout head 66 before the next character is formed. Readout head 66 includes a coil 67, which is coupled to a line amplifier 68. Amplifier 68 provides a signal at the proper level to transmission line 69, which can be a voice telephone line.

It will be observed that one end of the coil on each character head is connected to a common ground point 65. It will be further noted that ground connections are shown on pulse generators 44 and 45. The outputs of the generators are therefore symmetrical with respect to ground. Both generators are pulsed simultaneously during the concurrence of the timing pulse from trigger 47, the closing of send contact 41, and the eleventh count of counter 43. Through the agency of the code relays the output of one or the other of the generators is directed to the ungrounded end of the character head coils to record the proper frequency in the proper phase on medium 55.

One end of each of the start heads 58 is connected to ground 65 as are the character heads. The other ends are permanently connected to the output of the positive generator 45 by way of lead 62. Therefore, the start bit is always the positive half cycle of the marking frequency.

Parity heads 56 are differently connected. The leftmost parity head is permanently connected to the output of the negative generator by way of lead 64. Thus, the parity bit always ends as a negative half cycle. The rightmost parity head is pulsed either negatively to make the parity bit a half-cycle mark or positively to make it a full-cycle space. The right-hand parity head is connected to an output of the R8 code relay. The parity bit is always formed to make the number of marking bits in the character even, counting itself and the start bit. It is obvious that an odd parity bit may be generated, if desired, by connecting the left-hand parity head to the output of the positive pulse generator 45. However, phase continuity between characters is sacrificed in this case.

FIG. 3 is marked with plus and minus signs at the code relay outputs to represent the polarities at the several leads for an assumed representative eight-bit character as follows: MSMSSMSM. Code relays R1, R3, R6 and R8 are operated for this character. The remaining code relays remain in their released condition. The resultant waveform is shown in FIG. 4 in register with the corresponding character heads of FIG. 3.

The operation of the system for this assumed character is explained in the following manner. As soon as generators 44 and 45 are pulsed by gate 42 the start pulse is recorded as a positive half cycle of marking frequency. At the same time the operated code relay R1 makes both character outputs negative and a negative half cycle of marking frequency is recorded on the medium 55 to represent the first message bit. The other output leads become respectively negative and positive and by their series connection to code relay R2, which is released, cause the inputs to the latter relay to be also negative and positive. Therefore, code relay R2 causes its corresponding heads to record a full cycle of spacing frequency on the medium 55. Similarly the remaining code relay contacts are operated to record the full waveform of FIG. 4 on the magnetic medium. The remaining plus and minus signs show the condition of the other relays. The lower output of the last code relay R8 is applied to the right-hand parity head and forms thereby the correct parity bit as shown. The relay conditions are set up before the trigger pulse so that the whole waveform is recorded simultaneously. It is apparent from FIG. 4 that, including the parity bit, an even number of marking bits is present. The complete waveform is translated into an electrical signal in readout head 66 and applied to line 69 while the inhibit output of counter 43 is applied to gate 42.

At the assumed spacing frequency of 2300 cycles per second, 2300 bits or 209 eight-bit characters with start and parity bits may be transmitted per second with the circuit of FIG. 3. Spacing frequency is generated by heads 49 and 50 between characters.

A receiver for the signal of FIG. 4 can readily be constructed by one skilled in the art by means of the techniques described using two-gap heads of proper dimensions as discriminators. The output circuits can be similar to those described in connection with FIG. 9 of my cited copending application.

While the principles of this invention have been described in terms of specific embodiments utilizing specific frequencies, it will be apparent to those skilled in the art that various modifications are possible within the spirit and scope of the appended claims.

What is claimed is:

1. An electromechanical apparatus for recording a continuous frequency pattern on a moving magnetizable surface comprising two single-gap magnetic transducer heads fixedly positioned adjacent said surface, each having a coil of wire wound thereon, the first of said heads having a gap equal to a half wavelength of a predetermined frequency and the second head having a narrower gap and spaced along said surface in the direction of motion a multiple of a half wavelength from said first head, means for applying a direct-current bias to the coil on the first of said heads of a magnitude just adequate to saturate said magnetic surface, means for superimposing on the coil of the first of said heads a periodic pulse of current opposite in polarity to said direct-current bias and at twice the magnitude thereof, the combined effect of said direct-current-applying means and said superimposing means on said first head being to record a single cycle of the predetermined frequency on said surface, and means for applying the output of the coil of said second head induced therein by said moving surface as a triggering signal to said superimposing means once every cycle of said predetermined frequency.

2. The electromechanical apparatus according to claim 1 in which said transducer heads comprise two sheets of soft magnetic material separated by a soft magnetic spacer at one end and bent over at the other end into a common plane parallel to the axis of said spacer and formed into a tooth on each sheet positioned in line with each other and spaced by a half wavelength at the predetermined frequency along that line, and a spooled coil of wire positioned around said spacer.

3. An electromechanical apparatus for recording on a moving magnetizable surface a pattern representing a given number of half cycles of a sinusoidal wave comprising a direct-current pulse source, a magnetic transducer head, a coil of wire mounted on said head, means connecting said pulse source to said coil, a plurality of adjacent, oppositely directed poles on said head defining gaps therebetween at a spacing of a half wavelength at the predetermined frequency of said wave, the magnetic flux in adjacent poles being in opposite sense and the number of half cycles of said wave recorded by a pulse applied to said coil being equal to the number of said poles.

4. The electromechanical apparatus according to claim 3 in which the magnetic transducer head comprises two sheets of soft magnetic material in parallel planes separated by a soft magnetic spacer at one end thereof and bent over at right angles at the other end into a common plane and formed into individual poles alternately meshing with each other in the common plane and spaced from each other by a half wavelength at the predetermined frequency, and a smooth cylindrical surface whose axis of rotation is parallel to said spacer is defined by the outer edge of the other ends of said sheets.

5. An electromechanical apparatus for erasing from a previously magnetized moving magnetic surface and recording a continuous frequency wave pattern thereon comprising a pair of single-gap magnetic transducer heads spaced from each other by a half wavelength at a preassigned frequency and positioned in close proximity to said moving surface in the direction of motion thereof, the width of the gap between pole pieces of said heads being half a wavelength at the preassigned frequency, a coil of wire wound about the yoke of each head, a source of steady direct current of a given polarity and magnitude sufficient when applied to the coil on one of said pair of heads to saturate said surface in one direction, a source of unipolar pulses of a sense opposite to the current direction of said steady source and a magnitude when applied to the other of said pair of heads to saturate said surface in the other direction, means connecting said steady source to the coil on the first of said heads, means connecting said pulse source to the coil on the second of said heads in the direction of motion of said surface, a third single-gap magnetic head spaced along said magnetic surface by an integral multiple of a half wavelength from the nearest of said pair of heads, a coil of wire on said third head, said last-mentioned coil having induced in it an electrical wave at the preassigned frequency as the magnetic surface passes under the poles of the third head, and means responsive to each cycle of the electrical wave induced in said last-mentioned coil triggering said pulse source to drive the second of said pair of heads.

6. A frequency-shift data transmitter comprising a source of parallel data bit message characters, a continuously moving ferromagnetic surface, a plurality of single-gap magnetic transducer heads fixedly held adjacent said surface, a first pair of said heads being disposed adjacent each other for generating a saturating magnetic flux in said surface to erase any prior recorded patterns therefrom, a source of direct current coupled to one of said first pair of heads to saturate said surface, a pulse generator coupled to the other of said first pair of heads to reverse the flux created by said direct-current source, a third of said plurality of heads spaced from said first pair by a multiple of a half wavelength of a predetermined frequency, a trigger generator coupled between said third head and said pulse generator to cause the latter to outpulse at the proper instant to produce said determined frequency, the remainder of said heads being equally spaced along said surface in the direction of motion by a half wavelength at said predetermined frequency, there being a pair of heads assigned for each data bit in a message character, a start bit and a parity bit,
- means for pulsing the heads of a message pair with pulses of the same polarity to generate a half cycle of a marking frequency at half said predetermined frequency,
- means for pulsing the heads of a message pair with pulses of opposite polarity to generate a full cycle of said predetermined frequency,
- means interconnecting said pulsing means to assure smooth transitions in the frequency pattern impressed on said surface,
- means for pulsing both heads of the start bit generator in the same direction to imprint a half cycle of marking frequency, and
- means for pulsing the parity bit heads alike or differently according to the bits in the message character to produce an even number of marking bits overall.

7. A frequency-shift data transmitter comprising a binary data source generating multibit characters,
- a continuously moving ferromagnetic surface,
- a pair of single-gap magnetic recording heads for each character bit spaced along said surface,
- an additional pair of recording heads spaced to impress a timing pattern on said surface,
- a pick-up head for deriving a trigger signal from the timing pattern produced by said additional pair of recording heads,
- a pair of direct-current sources having outputs of opposite polarity,
- encoding means under the joint control of the individual data bits and said trigger signal for connecting each output of said direct-current sources to respective heads of a character-bit pair to encode a spacing bit as a full cycle of a first frequency and for connecting one only of the outputs of said direct-current sources to both heads of a character-bit pair to encode a marking bit as a half-cycle of a second frequency harmonically related to said first frequency,
- interconnecting means between said encoding means for insuring that said character-bit heads are energized in a direction to effect smooth transitions between said first and second frequencies,
- a final pair of recording heads for generating an even parity-bit magnetic pattern, and
- a final pick-up head for translating the magnetic pattern on said surface into a frequency-shift electric wave.

8. A binary digital data frequency-shift transmitter comprising
- a continuously moving ferromagnetic surface,
- a plurality of single-gap write heads positioned at spaced intervals adjacent to said surface,
- a direct-current bias source,
- a first pulse generator,
- means connecting said bias source to a first of said write heads,
- means connecting said first pulse generator to a second adjacent write head,
- a first pick-up head spaced from said first and second write heads and furnishing a trigger signal to said first pulse generator to force said first and second write heads to record a predetermined frequency pattern on said surface,

- a message data source furnishing a plurality of simultaneous outputs representing the individual bits in each data word,
- a plurality of code relays connected to the respective outputs of said message source and operated or not according to the status of the respective message outputs,
- a pair of input points and a first and second pair of output points on each code relay,
- means connecting the first pair of output points of each code relay, except the last, to the input points of the next succeeding code relay,
- means connecting the second pair of output points of each code relay to each of a pair of character write heads corresponding to each message character whereby said code relays are connected in tandem,
- second and third pulse generators having outputs of opposite polarity,
- means connecting the outputs of said second and third generators to the input points of the first code relay,
- means connecting the output of the second pulse generator to a pair of write heads for producing a start pulse,
- means connecting the output of the third pulse generator to one of the write heads designated a parity head,
- means connecting one of the second output points of the last code relay to the other write head designated a parity head,
- the arrangement of code relays being such that an operated relay when pulsed causes the flux in both character write heads of a pair to be in the same direction to record a half cycle of a marking frequency on the moving surface and an unoperated relay when pulsed to cause the flux in both character write heads of a pair to be in opposite directions to record a full cycle of a spacing frequency at twice the marking frequency on the moving surface,
- a send contact which is closed when a message character is to be encoded,
- means causing said second and third pulse generators to provide output signals to the code relays and to said start and parity write heads when the send contact closure and the first pulse generator output coincide,
- a transmission line,
- a readout head positioned adjacent to said moving surface beyond said write heads responsive to a megnetic pattern on said surface for delivering an electrical output signal to said transmission line, and
- a counter driven by the output of said first pulse generator having an inhibiting output applied to said causing means while the magnetic pattern recorded on said surface is being delivered to said transmission line by said readout head.

References Cited by the Examiner

UNITED STATES PATENTS

| | | | |
|---|---|---|---|
| 2,784,259 | 3/1957 | Camras | 179—100.2 |
| 3,052,885 | 9/1962 | Kump | 346—74 |

MAYNARD R. WILBUR, *Primary Examiner.*

J. H. WALLACE, *Assistant Examiner.*